United States Patent [19]

Erickson

[11] Patent Number: 4,554,193

[45] Date of Patent: Nov. 19, 1985

[54] SUBSTRATE WITH DIFFERENTIAL ADHESION

[75] Inventor: Nancy D. Erickson, North Oaks, Minn.

[73] Assignee: Ende Company, North Oaks, Minn.

[21] Appl. No.: 612,381

[22] Filed: May 21, 1984

[51] Int. Cl.$^4$ ............................................. A61F 13/02
[52] U.S. Cl. ................................... 428/40; 428/317.1; 428/317.3; 428/343; 428/354
[58] Field of Search .................. 428/317.3, 317.1, 343, 428/354, 40

[56] References Cited

U.S. PATENT DOCUMENTS

| | | | |
|---|---|---|---|
| 2,292,024 | 8/1942 | Dreher | 428/317.1 |
| 2,699,999 | 1/1955 | Mahler . | |
| 3,092,250 | 6/1963 | Knutson et al. | 206/59 |
| 3,311,338 | 3/1967 | Culley | 428/205 |
| 3,952,133 | 4/1976 | Amos et al. | 428/354 |
| 4,169,184 | 9/1979 | Pufahl | 428/343 |
| 4,273,827 | 6/1981 | Sweeney et al. | 428/307 |
| 4,310,137 | 1/1982 | Frye | 428/467 |

FOREIGN PATENT DOCUMENTS 660076 3/1963 Canada ............................ 428/317.3
926735 5/1963 United Kingdom ............ 428/317.3

Primary Examiner—Edith Buffalow
Attorney, Agent, or Firm—Orrin M. Haugen; Thomas J. Nikolai

[57] ABSTRACT

Bonding means for achieving differential adhesion of articles such as picture frames, posters, or other decorative items to wall surfaces and the like. The bonding device has adhesives secured to each of two major surfaces, with the adhesive having differential adhesion characteristics. A first adhesive is selected to achieve permanent bonding of the bonding means to the article to be displayed, with the second adhesive layer being an adhesive with low peel-low shear properties to permit removal from the wall surface whenever desired. The second adhesive provides semi-permanent positioning of the article being displayed, but permits removal thereof upon demand. The bonding means comprises a substrate with a first substantially permanent adhesive layer secured to one surface thereof, and with a co-extruded polyolefin-polyester film being bonded to the second surface thereof, and including a second adhesive layer applied to the polyester surface of the co-extruded film portion.

3 Claims, 2 Drawing Figures

SUBSTRATE WITH DIFFERENTIAL ADHESION

BACKGROUND OF THE INVENTION

The present invention relates generally to a device for semi-permanently bonding an article to a surface, such as a picture or poster to a wall surface so as to permit ease of removal without damaging or defacing the surface upon which the article is mounted. Typically, the article of the present invention is utilized to mount pictures and/or posters to wall surfaces so as to permit removal and/or re-positioning of the article displayed on the wall whenever desired.

Frequently, it is desirable to semi-permanently bond one article or material to a second surface, particularly when subsequent removal may be desired. While a variety of adhesives and other materials are commercially available for this purpose, certain limitations exist which render it possible to achieve certain of the objectives of semi-permanent bonding, but which fall short of providing all desirable characteristics for these operations. Also, magnetic mounting or attaching means have been utilized in the past, however these require a ferrous or other magnetic material for achieving their goals. While each of these systems have certain useful characteristics, each suffer from the limitation that they do not provide for controlled removal from a wide variety of mounting surfaces.

It is universally desirable to display photographs, paintings, or other decorative items on wall surfaces. Typically, such articles are framed in conventional picture frames. In each of these instances, the frame is mounted on the wall surface by a variety of techniques and devices. Also, it is frequently desired that means be provided to help maintain the frames in proper vertical and horizontal alignment, and a number of devices have been employed for accomplishing this purpose. Laminates of felt and rubber have frequently been employed, but their effectiveness has frequently been found to be limited and periodic straightening is necessary. Also, mechanical devices having an adhesive on one surface utilized to permanently affix the device to the frame, and a nail on the other surface for penetration into the wall surface to maintain horizontal and vertical alignment has also been used. Such devices, because of the penetration of the nail through the surface, may permanently deface the wall surface, and furthermore, it may become difficult to re-position the article in a different orientation if such repositioning becomes desirable.

A number of patents have been granted which address certain of the problems encountered, hwever these traditionally have fallen short of achieving the goals desired and reached by the present invention. In the Mahler U.S. Pat. No. 2,699,999, a method is disclosed for producing a mounting device which employs a discontinuous wax coating applied to opposed surfaces of a non-deformable sheet. The Dreher U.S. Pat. No. 2,292,024 discloses the use of a dual pressure sensitive sponge rubber device to mount advertising displays on surfaces. Differential adhesives have been suggested and employed, but when permanent bonds are desired, a non-pressure sensitive adhesive is normally employed. The Culley Patent 3,311,338 discloses a resilient pad coated on each of its two major surfaces with the same pressure sensitive adhesive material. Removability of an article using such a device is possible, but controlled removability would depend upon the surface upon which the article is bonded, and not to the device itself.

The Frye U.S. Pat. No. 4,310,137 discloses a mounting device which utilizes a splitting adhesive composite formulation, characterized by the use of tissue in order to achieve splitting of the adhesive surface. Use of such a device has been found to leave adhesive upon a surface, and thus rendering the article non-repositionable.

Articles similar in general design to the article of the present invention, but for different applications have been described. The Sweeney U.S. Pat. No. 4,273,827 teaches a dual adhesive coated assembly device for mounting body side moldings to automotive vehicles. However, only one of the adhesives described in the Sweeney Patent is pressure sensitive. The Amos U.S. Pat. No. 3,952,133 discloses a display device for the removable attachment of articles for display purposes. The Amos Patent discloses a rough surfaced, highly resilient body material which is continuously and uniformly coated with adhesives. Differential adhesives may be employed, but the higher adhesion material is utilized against the wall mounting surface. The lower adhesion properties are obtained with this device by controlling the area of contact, such as by means of a rough surfaced resilient body. The apparatus of the present invention overcomes each of the limitations of the presently commercially devices, as well as those disclosed in the above-referenced patents.

SUMMARY OF THE INVENTION

It is therefore a primary object of the present invention to provide an improved mounting means for semi-permanently bonding an article to a display surface such as a wall surface, and wherein pressure sensitive adhesives are applied to opposed surfaces of a substrate, and wherein one of the pressure adhesives permits removal and re-positioning of the article.

It is a further object of the present invention to provide an improved apparatus for removable mounting of an article to a wall surface, and wherein a substrate is provided having pressure sensitive adhesives secured to opposed surfaces thereof, with one adhesive providing substantially permanent bonding of the substrate, and with the other adhesive providing for removal and re-positioning of the substrate on the contacted surface.

It is yet a further object of the present invention to provide an improved article for adhesively adjustably securing an article to a wall surface and including a substrate with a substantially permanently bondable pressure sensitive adhesive film applied to one surface thereof, and with a pressure sensitive adhesive having semi-permanent bonding properties being applied to the opposed surface, wherein the second adhesive layer is applied to the surface of a substrate body having bonding characteristics including a modest peel strength to permit removal and re-bonding of the second adhesive layer to the mounting surface.

Other and further objects of the present invention will become apparent to those skilled in the art upon a study of the following specification, appended claims and accompanying drawings.

DESCRIPTION OF THE PREFERRED EMBODIMENT

Figure 1:
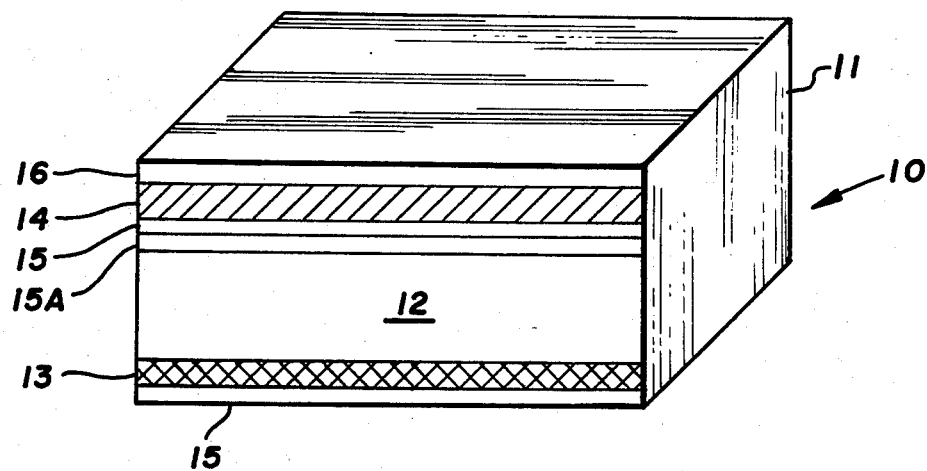
FIG. 1 is a perspective view, partially in section, illustrating a bonding article prepared in accordance with the present invention.

In accordance with the preferred embodiment of the present invention, particularly as illustrated in FIG. 1, the bonding device generally designated 10 comprises a three-dimensional body member 11 including a central substrate portion 12. The central substrate portion 12 is preferably a foam polyolefin, such as a closed-cell cross-linked polyethylene foam resin. Such closed-cell cross-linked polyethylene foam resins are commercially available. One major surface of substrate 12 has a very aggressive adhesive film bonded thereto, such as adhesive film 13. To the other surface, a differential adhesive, such as a removable adhesive 14 is applied thereto. Both adhesive films 13 and 14 are pressure sensitive adhesive films, and are, of course, commercially available. While adhesive film 13 has been characterized as being very aggressive, its properties are such that substantially permanent adhesion is achieved when applied to a surface. Release layers, such as release papers, are provided for each of the adhesive films, such as at 15 and 16.

Figure 2:
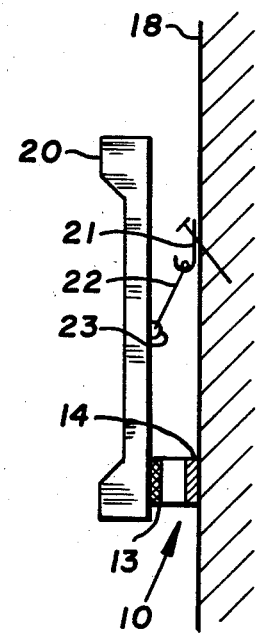
FIG. 2 is a sectional view showing the manner in which the bonding article of FIG. 1 may be utilized to assist in the mounting of a picture to a wall surface.

With attention being directed to FIG. 2, the bonding member 10 of the present invention is illustrated in use with the rear surface of a picture frame. In FIG. 2, the adhesive layer 13 is disposed adjacent the wall surface 18, while adhesive surface 13 is utilized to secure member 10 to the rear surface of picture frame 20. As indicated, adhesive surface 14 possesses modest or low peel-shear strength properties, and is utilized to steady or otherwise hold picture frame 20 in its desired position on the wall 18. Because of the low adhesion properties, frame 20 may be easily re-positioned without creating the presence of an adhesive residue on the surface of the wall. As indicated in FIG. 2, the picture frame 20 is hung on the wall surface in conventional fashion with the use of a conventional hanging hook member 21 along with the conventional hanging wire 22 and eyelets 23.

Since the adhesive film 14 has releasable characteristics, and is generally removable from wall surface 18, picture 20 may be re-positioned as desired.

The body portion 12 of bonding article 10 is, of course, a three-dimensional material and is preferably a polyethylene film. Because of the availability and economic considerations, low density polyolefin foams such as low density polyethylene foams are highly preferred. However, polyolefins, specifically polyethylene, have low surface energies rendering it difficult to obtain good adhesion of the foam material to other surfaces. While a number of methods have been attempted to achieve universal adhesion to polyolefin surfaces, these techniques are timeconsuming, costly, and generally ineffective. Organic resin as primers, flame treatment of the use of other coatings have been attempted, however the available methods have not made it possible to bond a variety of materials to polyolefins. Also, it has been generally impossible to achieve a permanent bond of a removable adhesive film, such as film 14, to the surface of a polyolefin substrate. In other words, if it is desired to achieve removability of an adhesive layer such as layer 14 from a wall surface, the removability feature may be adversely reflected or present in the bond between the adhesive and the polyolefin surface.

Furthermore, in accordance with the present invention, a co-extruded film having dissimilar surfaces is utilized. Co-extruded films of stress-oriented polyester and polyolefins are disclosed in U.S. Pat. Nos. 4,091,150 and 4,011,358. Accordingly, with further reference to FIG. 1, the surface of substrate 12 is in contact with a co-extruded film such as composite film 15-15A, with film layer 15 being a stress-oriented polyester film, and with film portion 15A being a polyethylene film. The polyethylene portion 15A is heat-laminated to the surface of substrate 12, with the higher critical surface energy side comprising the polyester film portion being exposed outwardly. It is this higher surface energy side or surface 15 which provides a base for receiving the removable adhesive layer 14.

It is normally advantageous to utilize a three-dimensional foam for the substrate 12 since such layers accommodate a wide variety of dimensional differences frequently encountered with materials used in the construction of pictures and picture frames. The three-dimensional nature of substrate 12 also permits the positioning of an article such as a picture frame a slight distance outwardly outwardly from the wall surface, such as wall surface 18. It has been found that a closed-cell cross-linked polyethylene foam resin has the most desirable characteristics for the apparatus of the present invention. Closed-cell cross-linked polyethylene foam resins are commercially available.

The following examples provide specific details of articles prepared in accordance with the present invention.

EXAMPLE I

The substrate material was selected as a closed-cell low density polyethylene foam having a density of 4.0 pounds per cubic foot and a thickness of 0.25 inches. Such foams are commercially available under the trade designation N-400 from Illbruck Co. of Minneapolis, Minn. To one surface of the foam sheet material there was laminated an aggresive pressure sensitive adhesive, with such adhesive being commercially available under the designation A-100 from Illbruck Co. of Minneapolis, Minn. To the opposed surface, a polyethylene/polyester composite co-extruded film was laminated with the polyethylene surface being in contact with the surface of the substrate. Such co-extruded polyethylene/polyester films are commerciall available from 3M Company of St. Paul, Minn. under the trademark SCOTCH PAC. Following heat lamination, a low strength adhesive was cold-laminated to the polyester surface of the article. Such low strength adhesives are commercially available, with one such adhesive being identified as Positional Mounting Adhesive and is available from the 3M Company of St. Paul, Minn. Both adhesive layers are provided with protective release films, such as release paper or the like to aid in processing and handling. The finished sheet material with adhesive layers on both major surfaces may be cut into desired squares of approximately 0.5 inches square. These devices are then ready to be affixed to articles to be displayed on wall surfaces.

These bonding articles were found to perform well on common wall surfaces such as paint, wood, finished wood, paper and vinyl wallpaper. Excellent horizontal and vertical positioning of the picture frame resulted and the picture maintained its position upon exposure to common handling and vibratory energy. The pictures may be easily removed from the wall surface and re-positioned when such removal and re-positioning is indicated. It was found that no adhesive residue was left on any of the wall surfaces tested.

EXAMPLE II

The method of Example I was repeated, but with a surlyn/polyethylene two layer film being employed in place of the polyester/polyethylene film. Surlyn/polyethylene co-extruded films are available commercially.

EXAMPLE III

The method set forth in Example I was utilized to make a bonding article, except a solid polyethylene sheet material of 0.25 inches in thickness was used in place of the polyethylene foam.

While the specific adhesive utilized in these examples are pressure sensitive adhesives, it is possible to use other adhesives for the first or permanent adhesive. Such adhesives such as neoprene, solvent based epoxy, or other similar adhesives may be used, it being noted, however, that those adhesives set forth hereinabove have been found to be most desirable.

I claim:

1. In a means for adhesively adjustably securing an article to a surface and including an adherent intermediary body with first and second coherent adhesive layers arranged on first and second opposed surfaces thereof, the improvement comprising:
   (a) said adherent intermediary body comprising a core member fabricated of a polyolefin synthetic resinous layer;
   (b) said first adhesive layer being a pressure sensitive adhesive material and being applied directly to said first surface and being characterized in that the adherent properties thereof produce a peel strength having a first value, and wherein;
   (c) said second adhesive layer being a pressure sensitive adhesive applied to the polyester outwardly disposed surface of a co-extruded polyolefin/polyester composite film, the inwardly disposed polyolefin surface of said co-extruded composite film being thermally bonded directly to the surface of said polyolefin core member.

2. The means for adhesively adjustably securing an article to a surface as defined in claim 1 being particularly characterized in that said core member is fabricated of a compressible polyethylene foam.

3. The means for adhesively adjustably securing an article to a surface as defined in claim 2 being particularly characterized in that said core member is fabricated of a closed-cell cross-linked polyethylene foam.

* * * * *